United States Patent
Byerley

(10) Patent No.: US 8,708,017 B2
(45) Date of Patent: Apr. 29, 2014

(54) ASSEMBLY FOR ALTERING THE DIAMETER OF TRANSFER RING OR DRUM APPARATUS THROUGH A BROAD RANGE

(75) Inventor: Mark S. Byerley, Greenback, TN (US)

(73) Assignee: BPS Engineering, LLC, Greenback, TN (US)

( * ) Notice: Subject to any disclaimer, the term of this patent is extended or adjusted under 35 U.S.C. 154(b) by 116 days.

(21) Appl. No.: 13/374,448

(22) Filed: Dec. 29, 2011

(65) Prior Publication Data

US 2012/0168087 A1 Jul. 5, 2012

Related U.S. Application Data

(60) Provisional application No. 61/460,381, filed on Dec. 31, 2010.

(51) Int. Cl.
*B29D 30/26* (2006.01)

(52) U.S. Cl.
USPC ........................ 156/417; 156/406.2

(58) Field of Classification Search
USPC ............... 156/414, 417–420, 406.2
See application file for complete search history.

(56) References Cited

U.S. PATENT DOCUMENTS

| | | | | |
|---|---|---|---|---|
| 3,536,566 | A | * 10/1970 | Frazier et al. | ................. 156/415 |
| 5,066,354 | A | * 11/1991 | Benjamin | .................... 279/2.13 |
| 5,232,542 | A | 8/1993 | Norjiri et al. | |
| 5,264,068 | A | 11/1993 | Masuda | |
| 5,635,016 | A | 6/1997 | Byerley | |
| 2011/0303366 | A1 | 12/2011 | Byerley | |
| 2012/0073728 | A1* | 3/2012 | Takasuga | ................... 156/110.1 |
| 2012/0318460 | A1* | 12/2012 | Popp et al. | .................... 156/415 |

FOREIGN PATENT DOCUMENTS

WO  WO-2010/140485 A1 * 12/2010

* cited by examiner

*Primary Examiner* — Geoffrey L Knable
(74) *Attorney, Agent, or Firm* — Michael E. McKee

(57) ABSTRACT

Elongate tire-building equipment having circumference-defining apparatus wherein the circumference serves as a forming surface or as a circumference-engaging surface utilizes ramp members which are regularly disposed about the equipment centerline and upon which the circumference-defining apparatus is mounted for movement radially toward and away from the equipment centerline. A thrust plate and an actuator are mounted at the ends of the equipment for movement toward or away from one another along the equipment centerline, and an assembly of guide tracks and guide blocks are interposed between the ramp members and the thrust plate and between the ramp members and the actuator so that the movement of the thrust plate and the actuator toward and away from one another effects the movement of the ramp members radially toward and away from the equipment centerline by a relatively large amount.

18 Claims, 10 Drawing Sheets

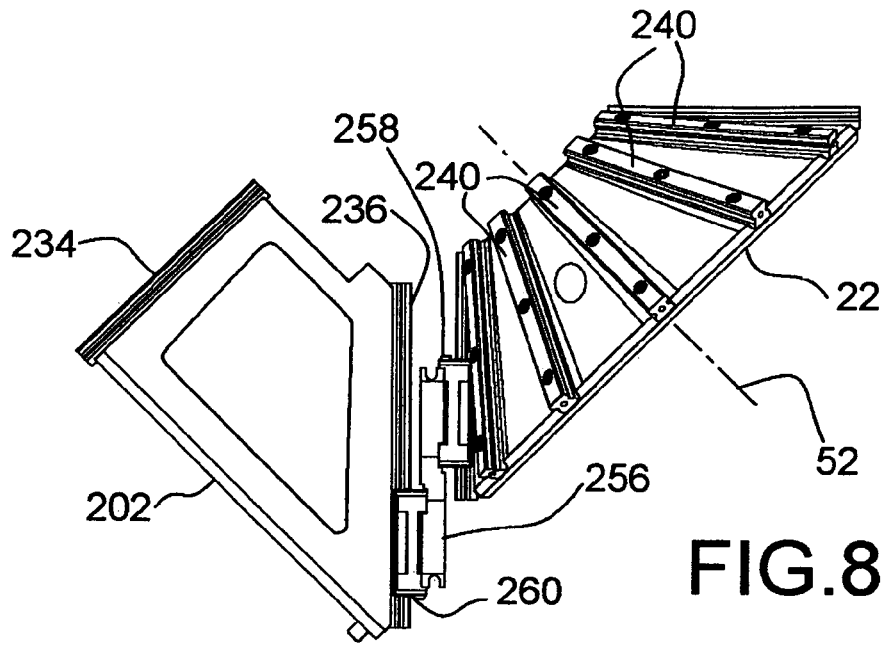
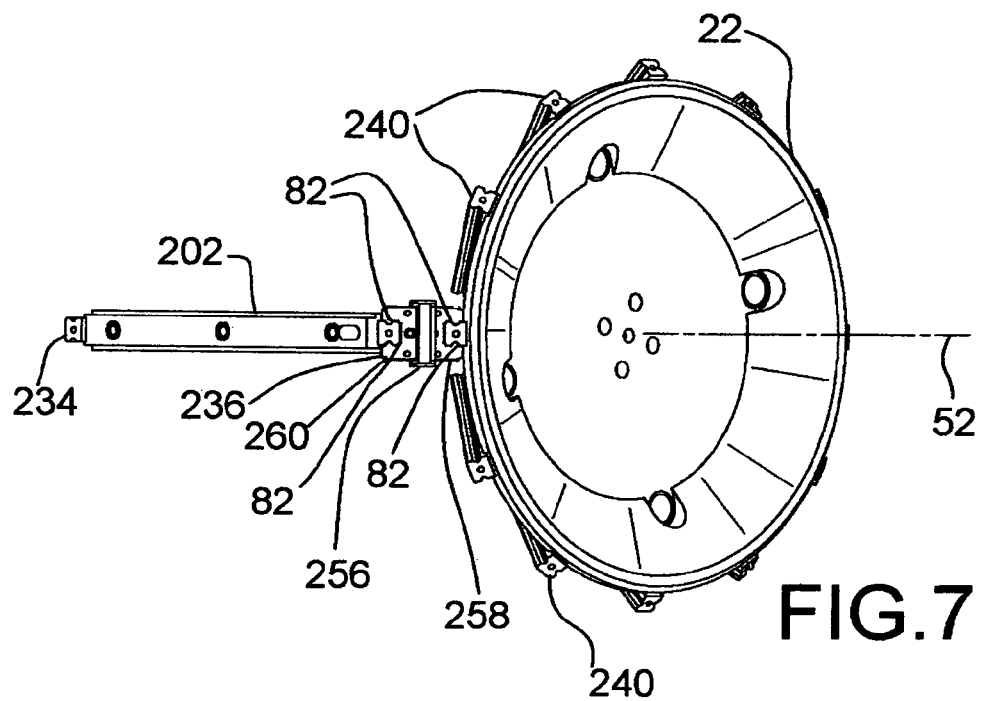

ASSEMBLY FOR ALTERING THE DIAMETER OF TRANSFER RING OR DRUM APPARATUS THROUGH A BROAD RANGE

The benefit of Provisional Application Ser. No. 61/460,381, filed Dec. 31, 2010 and entitled ASSEMBLY FOR ALTERING THE DIAMETER OF TRANSFER RING OR DRUM APPARATUS THROUGH A BROAD RANGE AND CIRCUMFERENCE-DEFINING SEGMENTS FOR USE THEREWITH is hereby claimed. The disclosure of this referenced provisional patent application is incorporated herein by reference.

BACKGROUND OF THE INVENTION

This invention relates generally to tire-making equipment and relates, more particularly, to apparatus which defines an outer circumference, or circumferential surface, which serves as a forming surface or for grasping the inner surface of a tubular (e.g. tire-shaped) object or for defining an inner circumference for grasping the outer surface of a circular, tubular or round object.

The tire-making equipment with which this invention is concerned includes belt and tread drums whose outer circumferential surface is capable of expanding and contracting and a transfer ring whose inner circumferential surface is capable of expanding and contracting. In the case of a belt and tread drum, the capacity of the outer circumferential surface to expand and contract accommodates the removal of a completed package from the drum circumference and to enable a single drum to be used to form belt and tread packages of alternative diameters. In the case of a transfer ring, the capacity of the inner circumferential surface to expand and contract enables the transfer ring to grasp or release the outer circumference of a belt and tread package when the transfer ring is positioned thereabout.

Conventional designs of the circumferential surfaces of such tire-making equipment involve the use of a plurality of multi-section segments disposed about a common centerline and whose outer or inner surfaces collectively define the circumferential surfaces. preferably, such multi-section segments are capable of moving relative to one another during the equipment expansion or contraction process so that the uniformity (i.e. the rounded nature) of the circumferential surface is not appreciably sacrificed. Unless such a uniformity of the circumferential surface is preserved between the expanded and contracted conditions of the equipment, bumps or non-rounded regions which may otherwise be formed about the circumferential surface are likely to contribute to inaccuracies formed within a tire component built upon or engaged by the circumferential surface of the equipment. The multi-sectional segments of one such prior art design is shown and described in U.S. Pat. No. 5,635,016, the disclosure of which is incorporated herein by reference.

Heretofore, prior art schemes for moving the circumference-defining segments of a drum, such as the drum of the referenced patent, toward or away from the longitudinal centerline of the drum for the purpose of collapsing or expanding the drum have involved a cam element which is slidably accepted by radially-extending slots provided in the drum equipment and which is radially moveable with respect to the drum centerline. By moving the opposite ends of the drum toward or away from one another, mechanisms associated with the cam plate radially shift the circumference-defining segments toward or away from the longitudinal centerline of the drum to thereby alter the diameter of the drum circumference.

However, prior art schemes for altering the diameter of a drum such as that described in the referenced patent are limited in that they cannot move the circumference-defining segments through a relatively broad range of movement. In other words, prior schemes for altering the diameter of drums having an adjustable diameters have been incapable of altering the diameter of the drums through a relatively broad range. Such limitations could, for example, be due to the physical limitations of the equipment or the extent to which the multiple circumference-defining segments could be moved away from one another and still provide adequate support along the circumference of the drum for the tire component intended to be engaged at the surface. In any event, such factors limit the capabilities of prior art schemes to expand (or collapse) the circumference-defining segments of known drums to a maximum range of about 1.4 to 1.

It would be desirable to provide a new and improved scheme for altering the diameter of a drum or transfer ring having a circumference of adjustable diameter which is capable of moving circumference-defining segments through a relatively broad range of radial displacement.

Accordingly, it is an object of the present invention to provide a new and improved diameter-adjusting assembly for incorporation into a drum or transfer ring having a circumference of adjustable diameter and which is capable of altering the diameter of such a drum or transfer ring through a relatively broad range of diameters.

Another object of the present invention is to provide such an assembly which is capable of expanding (or collapsing) the circumference-defining segments of a drum or transfer ring through a range as high as about 1.85 to 1 and provide still stable support for a tire component expected to engage the circumference at either end of the range.

Still another object of the present invention is to provide such an assembly which is relatively uncomplicated in structure, yet effective in operation.

SUMMARY OF THE INVENTION

This invention resides in an improvement in tire-building equipment having apparatus defining an outer circumference or an inner circumference to serve as a forming surface or as a circumference-engaging surface wherein the equipment includes two opposite ends and a longitudinal centerline which extends between the opposite ends.

The improvement includes a thrust plate associated with one end of the equipment and an actuator associated with the other end of the equipment, and the thrust plate and the actuator are mounted for movement toward and away from one another along the centerline of the equipment. In addition, there are provided ramp members upon which the circumference-defining apparatus are mounted for movement radially toward and away from the centerline of the equipment wherein the ramp members are disposed about the centerline of the equipment and are adapted to cooperate with the thrust plate and the actuator so that as the thrust plate and the actuator are moved toward and away from one another along the centerline of the equipment, the ramp members and the circumference-defining apparatus mounted thereupon are moved radially toward and away from the centerline of the equipment.

Moreover, the improvement includes intermediary members which are disposed between the thrust plate and the ramp members and between the actuator and the ramp members so that the ramp members are adapted to move relative to the intermediary members toward and away from the centerline of the equipment through a first permitted range of radial movement and wherein the intermediary members are adapted to move relative to the thrust plate and the actuator toward and away from the centerline of the equipment through a second permitted range of radial movement so that each of the first and second permitted ranges of radial movement contribute to the total range of permitted radial movement of the ramp members and the circumference-defining apparatus mounted thereupon toward and away from the centerline of the equipment.

BRIEF DESCRIPTION OF THE DRAWINGS

FIG. 7 is an alternative view of the drum fragment illustrated in FIG. 6 as viewed along the longitudinal axis of the guide block assembly shown in this fragment.

FIG. 8 is a view of the FIG. 6 fragment as seen from above in FIG. 7 and showing in side view the guide block assembly shown in this fragment.

DETAILED DESCRIPTION OF AN ILLUSTRATIVE EMBODIMENT

Figure 1:
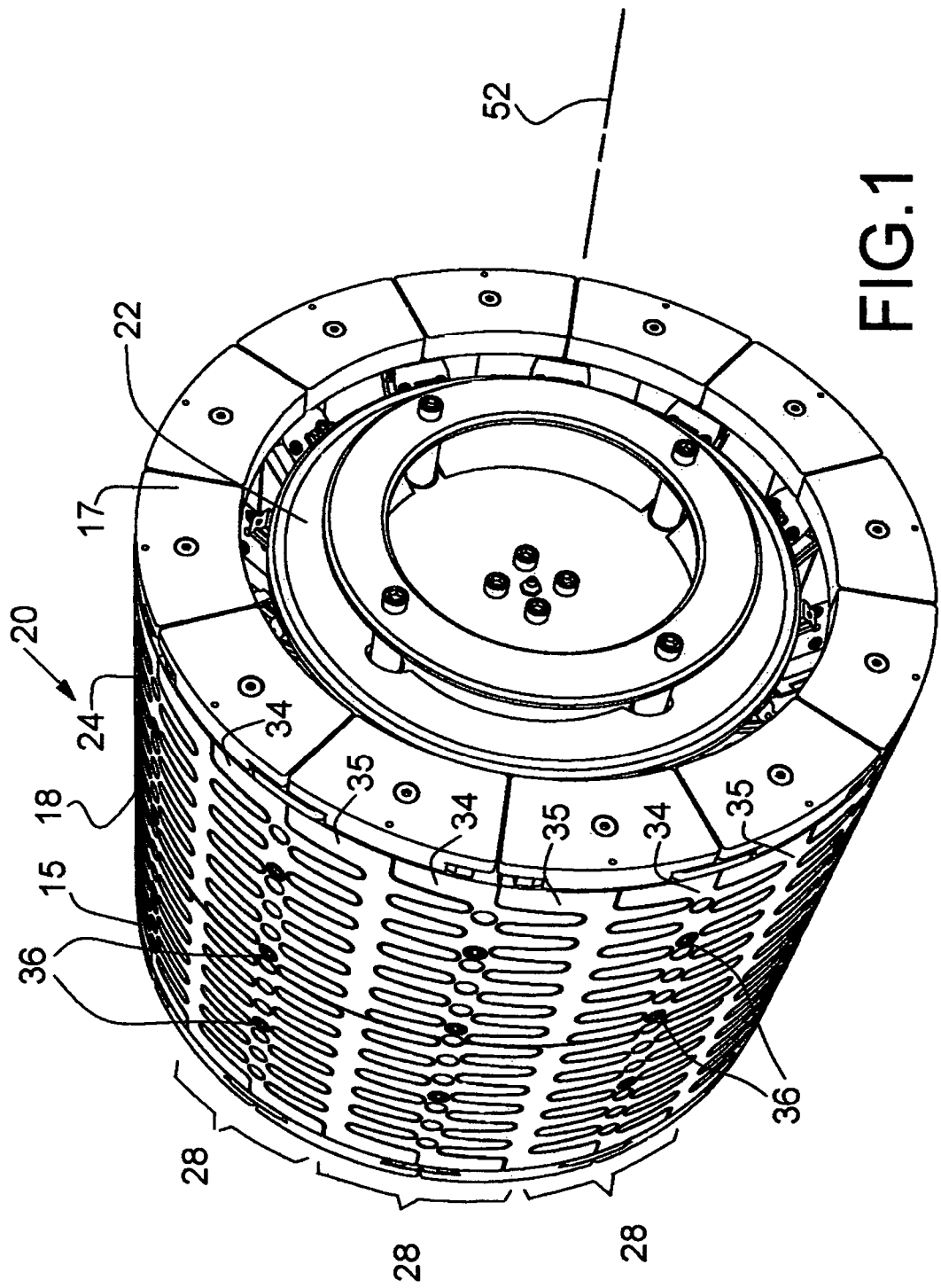
FIG. 1 is a perspective view illustrating schematically a belt and tread drum in which features of the present invention are incorporated.
Figure 2:
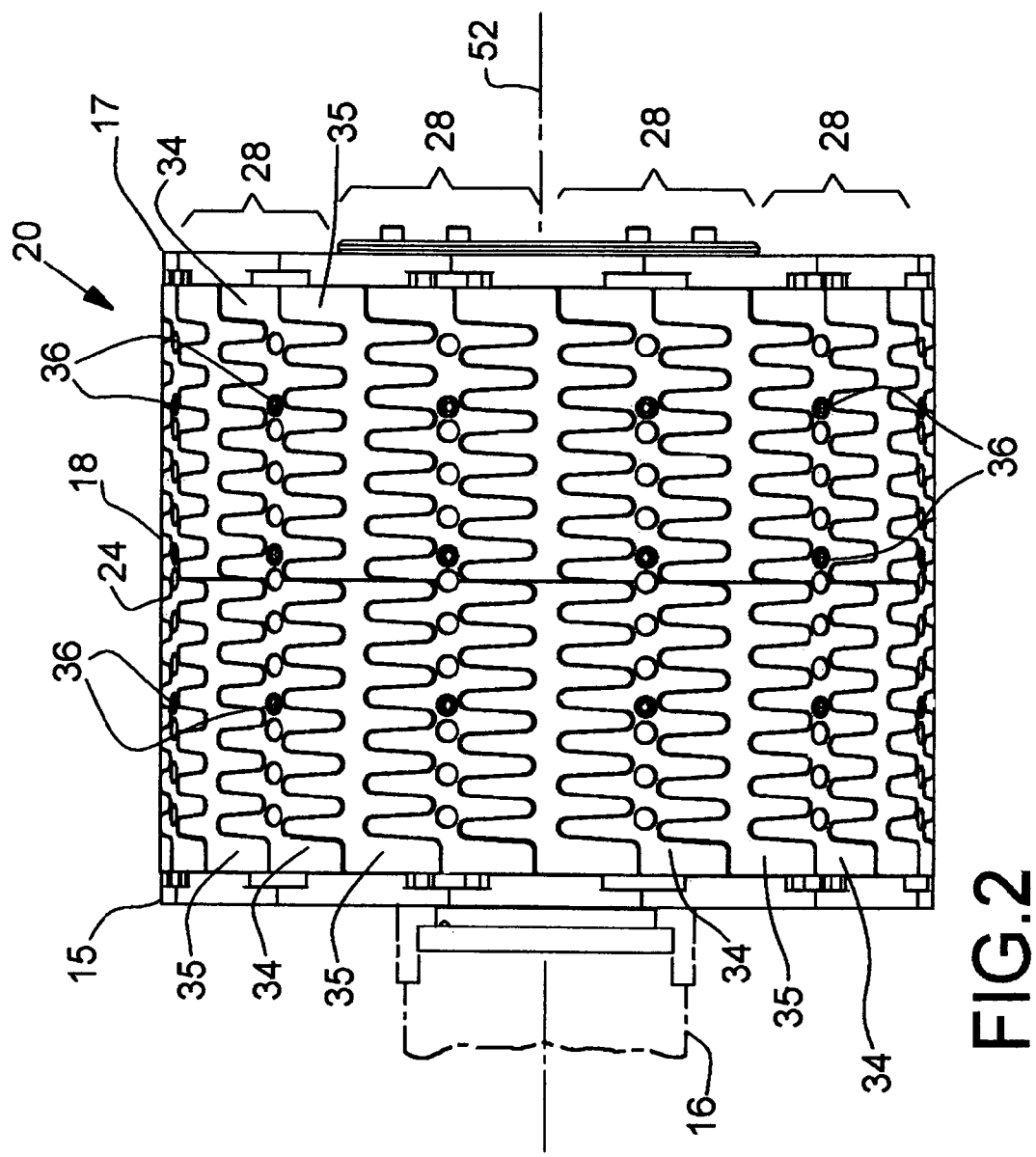
FIG. 2 is a side view of the belt and tread drum of FIG. 1.

Turning now to the drawings in greater detail and considering first FIGS. 1, 2, 3a and 3b, there is illustrated an embodiment, generally indicated 20, of a belt and tread drum within which features of the present invention are embodied. During the construction of a vehicle tire, the belt and tread drum 20 is used in the formation of a belt and tread package around the circumferential surface, indicated 18, of the drum 20.

The depicted belt and tread drum 20 includes a main shaft 51 which is mounted upon a support frame 16 and extends along a longitudinal central axis, or centerline, 52 of the drum 20 and includes a disc-shaped thrust plate 21 disposed at one end, indicated 15, of the drum 20 and a conically-shaped actuator 22 disposed at the other end, indicated 17, of the drum 20, and a central body portion 24 which is disposed between the thrust plate 21 and the actuator 22. The central body portion 24 includes a plurality of relatively movable components, the sum of whose movements results in a controlled and measured change in the diameter of the outer circumference 18 of the body portion 24 to accommodate the manufacture of tires of various sizes (i.e. tires of different diameters).

More specifically, the body portion 24 of the depicted belt and tread drum 20 includes a plurality of circumference-defining, multi-section segments 28 whose outer arcuate surfaces collectively define an arc or segment of the outer circumference of the drum 20. The circumference-defining segments 28 can take any of a number of forms, such as that shown and described in co-pending U.S. patent application Ser. No. 13/134,683 (Pub. No. US-2011-0303366-A1) naming the same inventor as the instant application and wherein the circumference-defining segments include a primary section 34 to which adjacent sections 35 are connected, but alternative forms of the circumference-defining segments can be had. For a detailed description of exemplary circumference-defining segments which can be used as the circumference-defining segments 28, reference can be had to co-pending application Ser. No. 13/134,683, the disclosure of which is incorporated herein by reference. In any event, the principles of the present invention can be variously applied.

It is a feature of the present invention that it includes means, generally, indicated 200, for moving the multi-section segments 28 radially inwardly and outwardly relative to the centerline 52 of the drum 20 through a relatively broad range of drum diameters for altering the working diameter of the drum 20 as measured across the outer circumference thereof. For purposes of moving the segments 28 radially inwardly and outwardly with respect to the drum centerline 52 and with reference to FIGS. 3a, 3b and 9, the central body portion 24 of the drum 20 includes a plurality of substantially flat ramp members 202 which are regularly arranged about the drum centerline 52 and so the plane of each ramp member 202 is oriented in an axial plane of the drum 20.

Furthermore, the perimeter of each ramp member 202 is somewhat trapezoidal in shape having a radially outwardly-facing edge surface 204, a radially inwardly-facing edge surface 206, and two end surfaces 208 and 210 which extend between the outwardly-facing and inwardly-facing edge surfaces 204 and 206. For attachment of segments 28 to the ramp members 202, there is provided in the outwardly-facing surface 206 of each ramp member 202 a plurality of bores 30 for accepting bolts 36 and threaded bushings 40 directed therein. More specifically, the bushings 40 are tightly accepted by the bores 30, and bolts 36 are directed through the openings provided in the primary section 34 of each segment 28 and tightened within the bushings 40 to secure the segments 28 against the outwardly-facing surfaces 204 of the ramp members 202. With the segments 28 being attached to the outwardly-facing edge surface 204 of the ramp members 202 in this manner, the segments 28 must move radially inwardly or outwardly relative to the drum centerline 52 as the ramp members 202 are moved radially inwardly or outwardly of the drum 20.

Within the depicted drum 20 and with reference again to FIGS. 3a and 3b, the thrust plate 21 is fixedly mounted upon the main shaft 51, and the actuator 22 is mounted upon the end of a central shaft 53 which is positioned within the main shaft 51 to accommodate axial movement of the actuator 22 relative to and along the length of the shaft 51 and thus, toward and away from the thrust plate 21 along the centerline 52. During an adjustment in the diameter of the outer circumference of the drum 20, the actuator 22 is moved axially toward and away from the thrust plate 21 and axially of the main shaft 51, and during this circumference-adjusting procedure, the ramp members 202 cooperate with the thrust plate 21 and actuator 22 so that the ramp members 202 are moved radially toward and away from the centerline 52 of the drum 20.

The movement of the actuator 22 can be effected manually by an operator through the use of a rotatable screw mechanism 26 whose shaft is threadably accepted by an internally-threaded opening which extends axially into the central shaft 53 upon which the actuator 22 mounted. In the alternative, the central shaft 53 upon which the actuator 22 is mounted can be moved axially of the support frame 16, and thus toward and away from the thrust plate 21, by air pressure applied within air cylinders (not shown) associated with the frame 16. Guide rods 29 (FIGS. 4 and 5) can be utilized to help maintain the actuator 22 in axial registry with the thrust plate 21.

With reference again to FIGS. 3*a* and 3*b*, there is interposed between the ramp members 202 and the thrust plate 21 and actuator 22 mechanical means (or mechanisms), generally indicated 220, which facilitate the radial movement of the ramp members 202 as the thrust plate 21 and actuator 22 are moved toward and away from one another. In connection with the foregoing, the thrust plate 21 has a substantially planar surface 222 (best shown in FIG. 5) which faces the end surfaces 208 of the ramp members 202, the actuator 22 defines a somewhat conically-shaped surface 226 (best shown in FIG. 4) which faces the end surfaces 210 of the ramp members 202, and the mechanical means 220 comprises intermediary members 245 disposed between the thrust plate 21 and the ramp member 202 and between the actuator 22 and the ramp member 202 which enable the ramp members 202 to move radially toward and away from the drum centerline 52 as the thrust plate 21 and actuator 22 are moved toward and away from one another along the drum centerline 52.

Figure 3A:
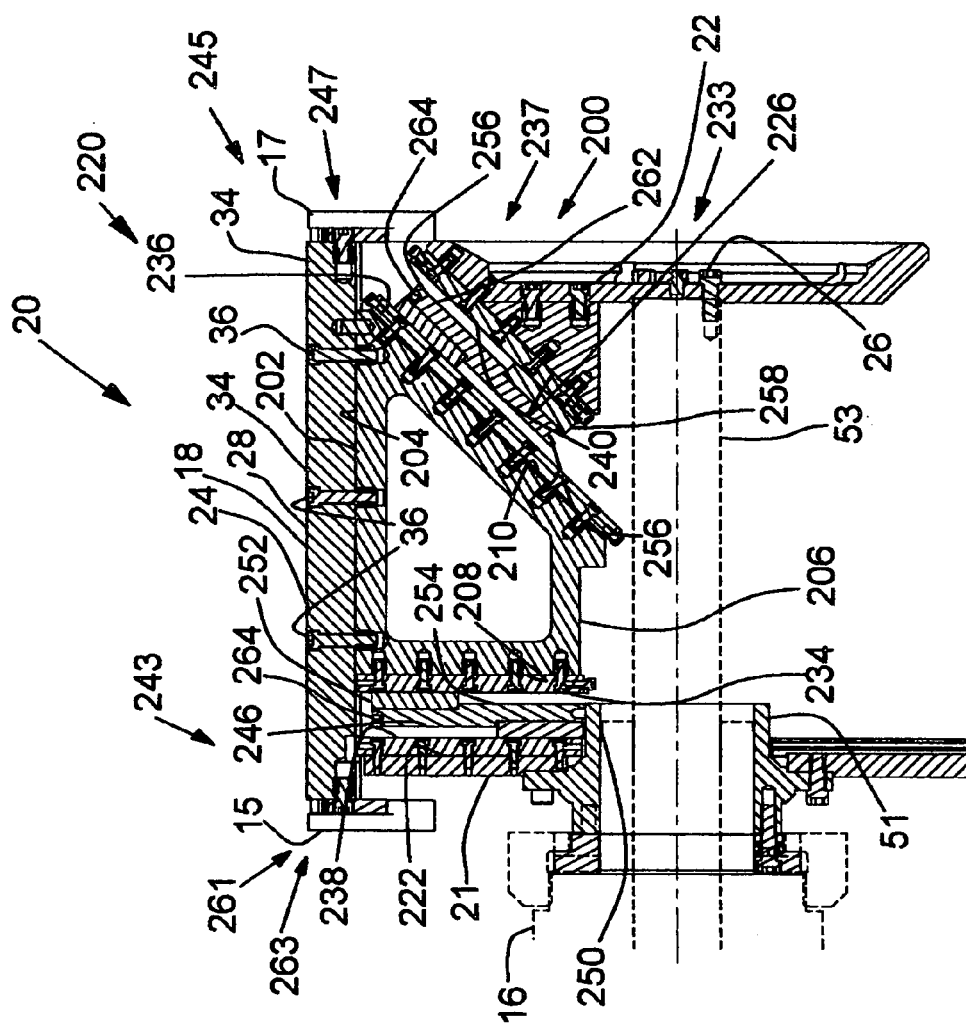
FIG. 3a is a longitudinal cross-sectional view of the FIG. 1 drum illustrating schematically the means by which the diameter of the circumference, or the circumferential surface, of the drum is adjusted and illustrating the circumferential surface of the drum in a fully-collapsed condition.
Figure 3B:
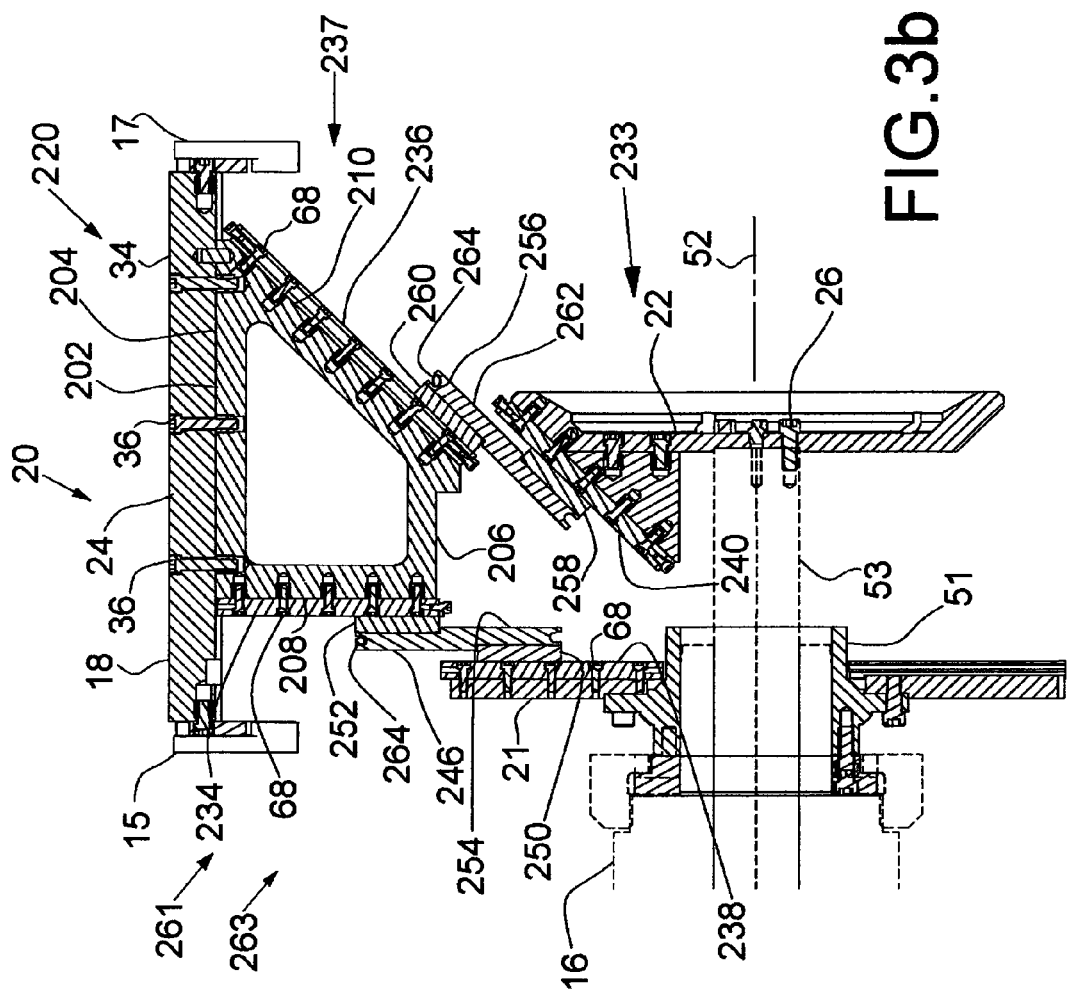
FIG. 3b is a longitudinal cross-sectional view like that of FIG. 3a, but illustrating the circumferential surface of the drum in a fully-expanded condition.

In connection with the foregoing, the intermediary members 245 includes a first set, generally indicated 237 in FIGS. 3*a* and 3*b*, of linear (elongated) guideways, or guide track members, 237 associated with the ramp members 202 and along which guide block assemblies (described herein) are permitted to move and a second set, generally indicated 233 in FIGS. 3*a* and 3*b*) of linear (elongated) guideways, or guide track members, associated with the thrust plate 21 and the actuator 22 and along which the guide block assemblies are permitted to move. The first set 237 of guide track members include guide tracks 234 which are attached to the end surfaces 208 of the ramp members 202 so as to extend radially of the drum 20 and also includes guide tracks 236 which are attached to the end surfaces 210 of the ramp members 202 so as to extend therealong.

Figure 4:
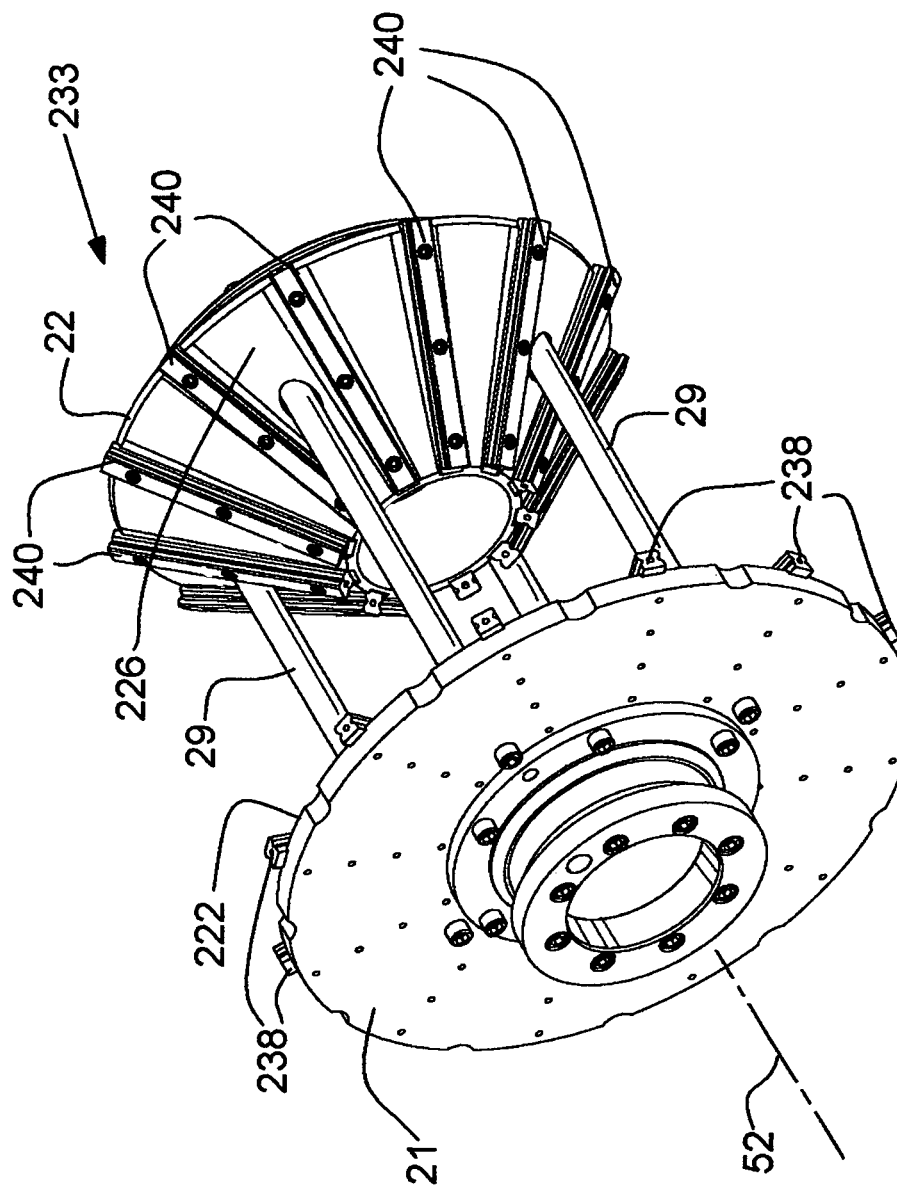
FIG. 4 is a perspective view of the FIG. 1 drum, shown with the ramp members and circumference-defining segments removed therefrom.
Figure 5:
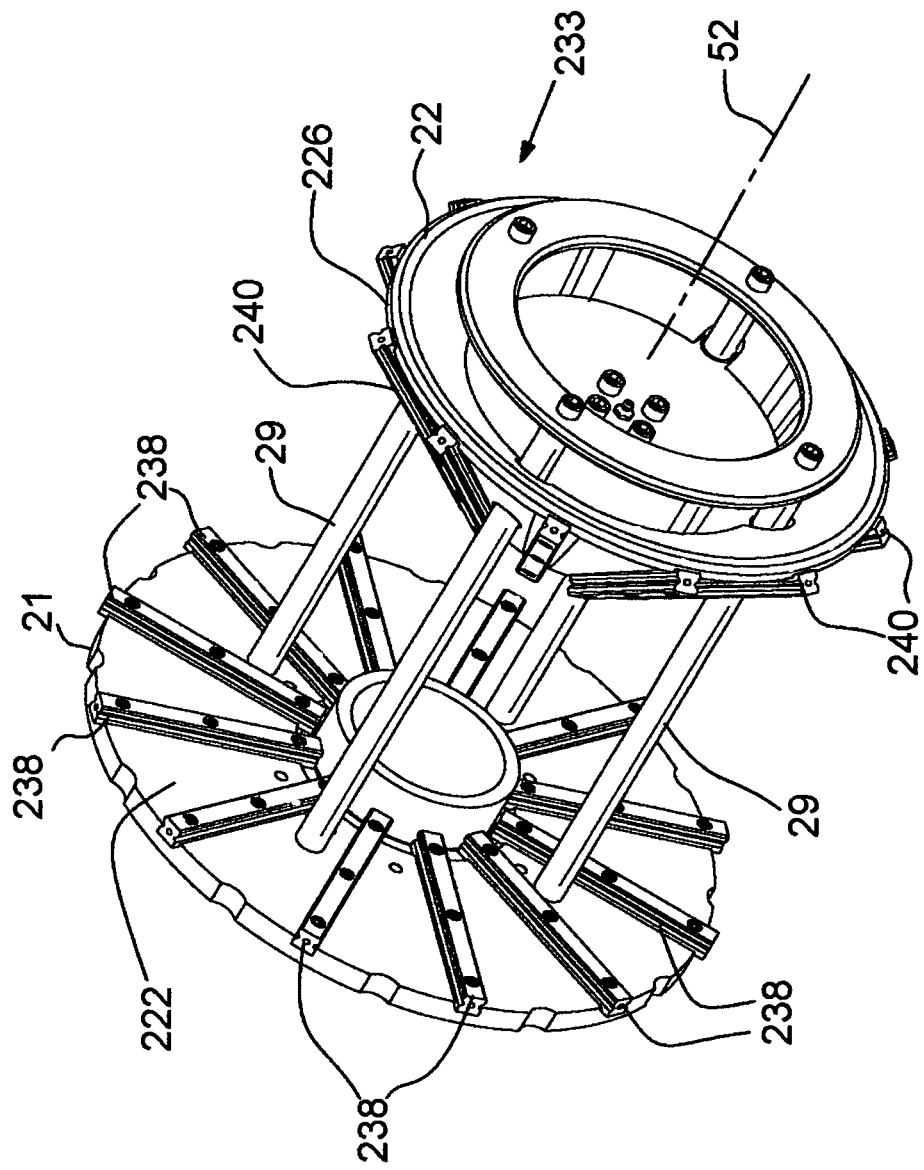
FIG. 5 is a perspective view of the FIG. 1 drum like that of FIG. 4, but seen from an alternative perspective to that shown in FIG. 4.
Figure 6:
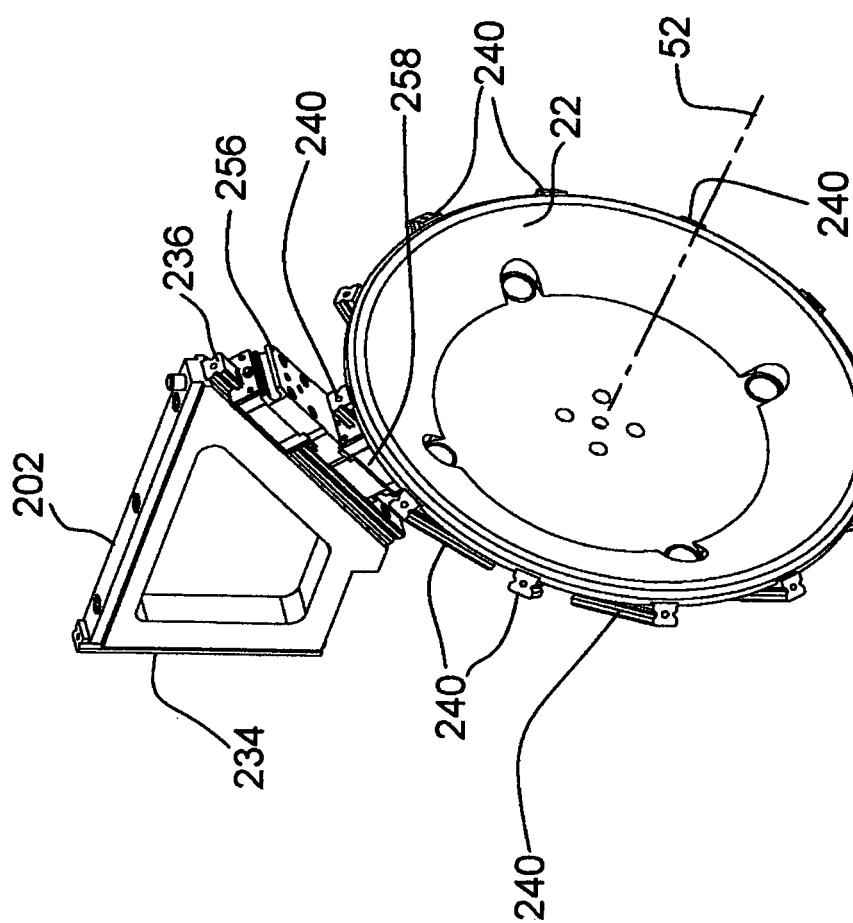
FIG. 6 is a perspective view of a fragment of the FIG. 1 drum showing an intermediary guide block assembly which connects a ramp member to the actuator.

By comparison, the second set 233 of guide track members include guide tracks 238 which are mounted along the substantially planar surface 222 of the thrust plate 21 (as best shown in FIG. 5) so that each guide track 238 extends radially therealong and further includes guide tracks 240 which are mounted along the conical surface 224 of the actuator 22 (as best shown in FIG. 4) so that the path followed by the guide tracks 240 along the conical surface 224 has a radial component. In addition, the guide tracks 240 are disposed about the actuator 22 in a conical arrangement whose central axis coincides with the drum centerline 52 and wherein the apex of the conical arrangement is directed toward the thrust plate 21. As will be apparent herein, this conical arrangement of the guide tracks 240 about the actuator 22 promotes a cam-action response of the ramp members 202 radially of the drum 20 as the actuator 22 is moved toward and away from the thrust plate 21 along the drum centerline 52.

Furthermore, each guide track 234 of the first set 237 is positioned in registry with, or is substantially radially aligned with, a corresponding guide track 238 (of the second set 233) mounted upon the thrust plate 21, and each guide track 236 (of the first set 237) is positioned in registry with, or is substantially radially aligned with, a corresponding guide track 240 (of the second set 233) mounted upon the actuator 22. As will be apparent herein, such a relative disposition between the guide tracks 234 and 238 and between the guide tracks 236 and 240 facilitate the capacity of a single guide block assembly (described herein) to cooperate with either both guide tracks 234 and 238 or both guide tracks 236 and 240.

Figure 9:
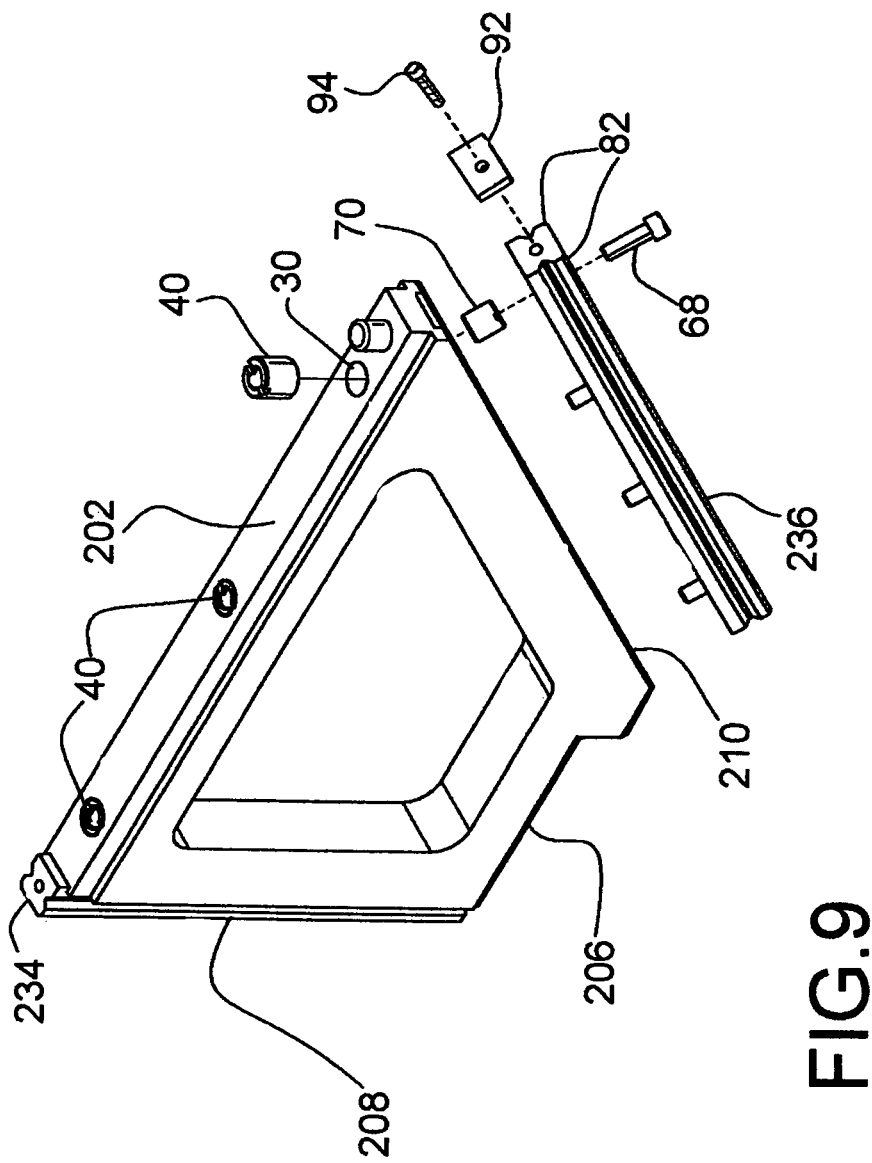
FIG. 9 is a perspective view of a ramp member and guide track of the FIG. 1 drum, shown exploded.

As exemplified by the guide track 236 of FIG. 9, each guide track of the first and second sets 237 and 233, respectively, of guide track members is linear in form and is secured to the surface of a corresponding component (i.e. the thrust plate 21, the actuator 22 or the ramp member 202) with bolts 68 and internally-threaded bushings 70, and defines a pair of lips 82 which extend outwardly from opposite sides thereof for a reason which will be apparent herein.

Figure 10:
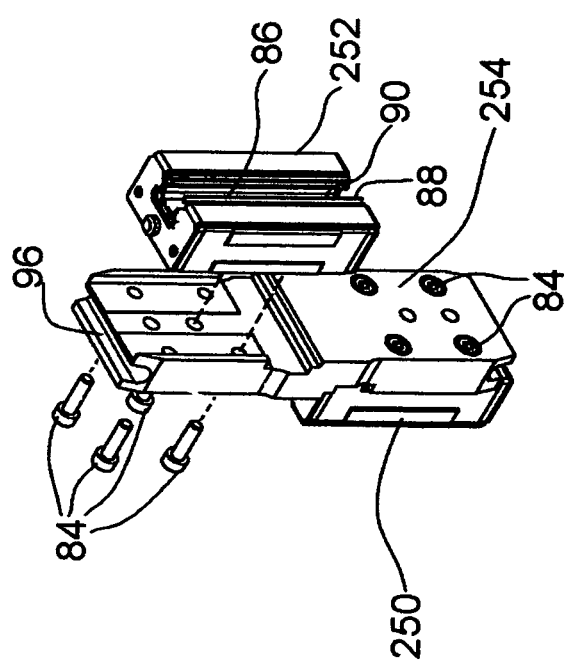
FIG. 10 is a perspective view of a guide block assembly of the FIG. 1 drum, shown exploded.

With reference to FIGS. 3*a*, 3*b* and 10, the intermediary members 245 includes a first set, indicated 247, of guide block assemblies 246 wherein each guide block assembly 246 of the first set 247 is disposed between a corresponding pair of guide tracks 234 and 238 (associated with the ramp members 202 and thrust plate 21, respectively) for longitudinal movement therealong and further includes a second set, indicated 243, of guide block assemblies 256 wherein each guide block assembly 256 of the second set 243 is disposed between a corresponding pair of guide tracks 236 and 240 (associated with the ramp members 202 and actuator 22, respectively) for longitudinal movement therealong. Each guide block assemblies 246 (best shown in FIG. 10) includes a pair of elongated guide blocks 250 and 252 and each guide block assembly 256 includes a pair of elongated guide blocks 258 and 260. As exemplified by the guide block assembly 246 of FIG. 10, the guide blocks of each guide block assembly 246 or 256 are fixedly joined to one another by way of an elongated strut member 254 or 262 and screws 84 which pass through the body of the strut member 254 or 262 and into the body of the guide block. In addition, each guide block 250, 252, 258 or 260 includes a body along which is defined a linear groove 86 which opens out of one side of the block body and which is somewhat trapezoidal in cross section so that its opposite walls, such as is indicated 88 and 90 in the guide block 252 of FIG. 10, converge toward one another as a path is traced outwardly along the sides of the groove 86.

With reference to FIGS. 3*a*, 3*b* and 6-9, each guide block of a guide block assembly 246 or 256 is slidably positioned upon and captured about a corresponding guide track of the drum 20 so that the movement of each guide block is constrained to linear movement (in one direction or the other) along the length of the corresponding guide track. In this connection, the outwardly-directed lips 82 of each guide track are captured within the linear groove 86 of a corresponding guide block to prevent movement of the guide block relative to the guide track in any direction other than longitudinally along the length of the guide track. More specifically, the guide blocks 252 and 250 of the guide block assembly 246 are each captured about a corresponding guide track 234 or 238, respectively, and the guide blocks 260 and 258 of the guide block assembly 256 are each captured about a corresponding guide track 236 or 240, respectively, for sliding movement therealong.

In order to confine movement of the guide blocks between the ends of the corresponding guide tracks, and thus prevent movement of the guide blocks off the ends of the guide tracks upon which the guide blocks are mounted, a plate-like end cap 92 (best shown in FIG. 9) is secured to each end of each guide track with a screw 94 to block movement of the guide block further along the guide track than the end thereof. It will also be understood that the guide tracks 234, 238, 236 and 240 and the aforedescribed components of the guide block assemblies 246 and 256 are strong enough to stably support the weight of the ramp members 202 and any tire component which may be built up about the circumference-defining segments 28 supported by the ramp members 202 during use of the drum 20.

It follows from the foregoing that with the guide block assemblies 246 slidably mounted upon the guide tracks 234 and 236 for movement therealong and with the guide block assemblies 256 slidably mounted upon the guide tracks 238 and 240 for movement therealong, the ramp members 202 (and the circumference-defining segments 28 supported thereby) are capable of moving away from and toward the drum centerline 52 in a cam-action response to the movement of the actuator 22 toward and away from the thrust plate 21. More specifically, as the actuator 22 is moved toward or away from the thrust plate 21, the ramp members 202 are permitted to move radially of the drum 20 (through a first permitted range of radial movement) as the ramp members 202 (and the guide tracks 234 and 236 attached thereto) are permitted to slidably move linearly along the guide blocks 252 and 260 of the guide block assemblies 246 and 256, respectively. Similarly and as the actuator 22 is moved toward and away from the thrust plate 21, the guide block assemblies 246 and 256 are permitted to move radially of the drum 20 (through a second permitted range of radial movement) as the guide blocks 250 and 258 are permitted to slidably move linearly along the length of the guide tracks 238 and 240, respectively.

Therefore and due to the independence of movement of the guide block assemblies 246 and 256 relative to the thrust plate 21 and relative to the ramp members 202 as aforedescribed, the total permitted range of radial adjustment, or displacement, of the ramp members 202 relative to the drum centerline 52 is equal to about the sum of the first and second permitted range of radial movement, and the drum 20 is advantageous in this respect.

For example, when the ramp members 202 are positioned in the fully-collapsed condition of the drum 20, as depicted in FIG. 3a (and at which the diameter of the drum circumference is at its smallest diameter), the guide blocks 252 and 260 are disposed at its radially outwardmost position along the length of the guide tracks 234 and 236 and the guide blocks 250 and 258 are disposed its radially inwardmost position along the length of the guide tracks 238 and 240. By subsequently moving the actuator 22 toward the thrust plate 21 and along the drum centerline 52 from the fully collapsed condition of the drum 20, the ramp members 202 are permitted to slidably move outwardly of the guide block assemblies 246 and 256 as the guide tracks 234 and 236 are permitted to slidably move radially outwardly of the drum 20 along the guide blocks 252 and 260, respectively, and the guide block assemblies 246 and 256 are permitted to slidably move radially outwardly of the thrust plate 21 as the guide blocks 250 and 258 are permitted to slidably move radially outwardly of the drum 20 along the guide tracks 238 and 240, respectively. Consequently and as depicted in the fully-expanded drum condition of FIG. 3b, the aforedescribed system of guide tracks and guide block assemblies of the mechanical means 220 permits the ramp members 202 to move radially outwardly of the drum centerline 52 (e.g. to a fully expanded condition of the drum 20 as depicted in FIG. 3b) by a distance which is compounded by the extent of the permitted radial movement of the ramp members 202 relative to and along the guide block assemblies 246 and 256 (which permitted range of radial movement is about equal to the length of a guide track 234) and the extent of the permitted radial movement of the guide track assemblies 246 and 256 relative to and along the length of the guide tracks 238 and 240, respectively, (which permitted range of radial movement is about equal to the length of a guide track 238).

It also follows that as the actuator 22 is moved away from the thrust plate 21 along the drum centerline 52 from the FIG. 3b fully expanded condition of the drum 20, the ramp members 202 are moved radially inwardly of the drum 20 toward the FIG. 3a fully collapsed condition as the guide block assemblies 246 and 256 are permitted to move radially inwardly along the thrust plate 21 and actuator 22 as the guide blocks 250 and 258 are permitted to slidably move radially inwardly along the guide tracks 238 and 240, respectively, and as the guide tracks 234 and 236 are permitted to slidably move radially inwardly of the drum 20 along the guide blocks 252 and 260, respectively. It is also understood that during the movement of the actuator 22 toward and away from the thrust plate 21 as described above to effect the radial movement of the ramp members 202 between the FIG. 3a fully expanded condition and the FIG. 3b fully collapsed condition, the ramp members 202 and the guide track assemblies 246 and 256 cooperate as guideway and guideway followers while the guide block assemblies 246 and 256 and the guide tracks 238 and 240, respectively, cooperate as guideway and guideway followers.

It is also a feature of the drum 20 that it includes means, generally indicated 261 in FIGS. 3a and 3b, for constraining the movement of the guide track assemblies 246 and 256 along the length of the guide tracks 238 and 240 so that as long as there exists any length of the guide tracks 234 and 236 along which the guide block assemblies 246 and 256 are permitted to move, the guide block assemblies 246 and 256 remain in a stationary condition at the radially inwardmost ends of the guide tracks 238 and 240. In other words and during movement of the ramp members 202 from the FIG. 3a fully collapsed condition to the FIG. 3b fully expanded condition, the guide block assemblies 234 and 238 are deterred from moving (either radially inwardly or outwardly) along the guide tracks 238 and 240 unless and until the ramp members 202 have been moved radially to a position at which the guide block assemblies 246 and 256 are disposed at the radially inwardmost ends of the guide tracks 234 and 236, respectively.

Within the drum 20, such a constraining means 261 includes means, generally indicated 263, for biasing the guide block assemblies 246 and 256 radially inwardly of the drum 20 toward the radially inwardmost position along the length of the guide tracks 238 and 240. By way of example, the biasing means 263 of the depicted drum 20 can take the form of a pair of relatively strong elastomeric bands 264 which encircle the collective group of strut members 254 and 262 of the guide block assemblies 246 and 256 so that as the ramp members 202 are urged radially outwardly with respect to the drum centerline 52 (by the movement of the actuator 22 toward the thrust plate 21), the ramp members 202 (by way of the guide tracks 234 and 236) are permitted to slidably move relative to and along the guide blocks 252 and 260, respectively, for the entire length of permitted movement therealong before the guide block assemblies 246 and 256 (by way of the guide blocks 250 and 258) are permitted to slidably move relative to and along the length of the guide tracks 238 and 240, respectively. To facilitate the passage of the band 264 across the strut members 254 and 262 and with reference again to FIG. 10, each strut member 254 or 262 is provided with a transversely-extending groove 96 in the end thereof for accepting the band 264 as it is passed thereacross.

As mentioned above, an advantage provided by the aforedescribed drum 20 relates to the increased, or compounded, range of radial movement of the circumference-defining segments 28 over other drum systems of the prior art, and such an advantage provides a broad range of diameters at which the circumference-defining segments 28 can be set for use. In fact, whereas the maximum range of permitted radial movement of the circumference-defining segments in other tire-making drums is known to be about 1.4 to 1, the range of permitted radial movement of the circumference-defining segments 28 in the drum 20 is about as large as 1.85 to 1. Moreover, tests conducted to date have found that staged cycle movement reduced the belt and tread time slot in the cycle time of tire machine by about fifty percent. Further still and with the depicted drum 20, there is no need to halt a tire assembly process in order to fit or remove additional spacers or decks, and there is a reduced need to confirm drum settings, due to the stability of not having to change drum parts to establish a larger size.

Yet further, there is less wear on drum components due to the staged cycle, and in an instance in which the actuator 22 is moved toward or away from the thrust plate 21 with air pressure, less air volume is needed to make adjustments to the drum circumference, hence less cost will be required to operate the drum 20. Morever and because the drum 20 requires no add-on parts to accommodate a change in the diameter of the drum 20, the current time required to change the setting of the diameter of the circumference-defining segments 28 between the fully-collapsed condition of FIG. 3a and the fully-expanded condition of FIG. 3b is about twenty seconds.

It will be understood that numerous modifications and substitutions can be had to the aforedescribed embodiment without departing from the spirit of the invention. For example, although the present invention has been described herein in conjunction with a tire-building drum 20 having an outer circumference 18 about which tire components can be built, the principles of the present invention can be embodied within an apparatus having an outer circumference for grasping the inner surface of a tubular (e.g. tire-shaped) object or an apparatus having an inner circumference for grasping the outer surface of a circular, tubular or round object. For example, the principles of the present invention can be embodied in a transfer ring for grasping a completed belt and tread package following completion of its build up and its release from a belt and tread drum by engaging the outer circumference of the package with the inner arcuate surfaces of the segments of the transfer ring. As is recognized in the vehicle tire industry, this engagement of the package-engaging surfaces (or "shoes") of the transfer ring and the outer circumferential surface of the belt and tread package must be effected very carefully to avoid indentations in the package by the shoes. Otherwise, such indentations commonly later show up as imperfections in the finished vehicle tire.

Accordingly, the aforedescribed embodiment 20 is intended for the purpose of illustration and not as limitation.

The invention claimed is:

1. In tire-building equipment having apparatus defining an outer circumference or an inner circumference to serve as a forming surface or as a circumference-engaging surface wherein the equipment includes two opposite ends and a longitudinal centerline, the improvement comprising:

a thrust plate associated with one end of the equipment;
an actuator associated with the other end of the equipment, and the thrust plate and the actuator being mounted for movement toward and away from one another along the centerline of the equipment;

ramp members upon which the circumference-defining apparatus are mounted for movement radially toward and away from the centerline of the equipment wherein the ramp members are disposed about the centerline of the equipment and adapted to cooperate with the thrust plate and the actuator so that as the thrust plate and the actuator are moved toward and away from one another along the centerline of the equipment, the ramp members and the circumference-defining apparatus mounted thereupon are moved radially toward and away from the centerline of the equipment; and intermediary members which are disposed between the thrust plate and the ramp members and between the actuator and the ramp members wherein the ramp members are adapted to move relative to the intermediary members toward and away from the centerline of the equipment though a first permitted range of radial movement and wherein the intermediary members are adapted to move relative to the thrust plate and the actuator toward and away from the centerline of the equipment through a second permitted range of radial movement so that each of the first and second permitted ranges of radial movement contribute to the total range of permitted radial movement of the ramp members and the circumference-defining apparatus mounted thereupon toward and away from the centerline of the equipment.

2. The tire-building equipment as defined in claim 1 wherein the ramp members and the circumference-defining apparatus mounted thereupon are radially movable toward and away from the centerline of the equipment between a fully collapsed condition and a fully expanded condition and wherein the movement of the thrust plate and the actuator toward one another moves the ramp members and the circumference-defining apparatus mounted thereupon from the fully collapsed condition toward the fully expanded condition and wherein the movement of the thrust plate and the actuator away from one another moves the ramp members and the circumference-defining apparatus mounted thereupon from the fully expanded condition toward a fully collapsed condition.

3. The tire-building equipment as defined in claim 2 wherein the movement of the ramp members relative to the intermediary members and the movement of the intermediary members relative to the thrust plate and the actuator are effected in sequence as the thrust plate and the actuator are moved toward and away from one another from one distance therebetween which corresponds to the fully collapsed condition to another distance therebetween which corresponds to the fully expanded condition.

4. The tire-building equipment as defined in claim 3 wherein the movement of the thrust plate and the actuator toward one another from the one distance therebetween to the another distance therebetween effects the movement of the ramp members relative to the intermediary members through the first permitted range of radial movement and then effects the movement of the intermediary members relative to the thrust plate and the actuator through the second range of permitted radial movement.

5. The tire-building equipment as defined in claim 3 wherein the movement of the thrust plate and the actuator away from one another from the another distance therebetween to the one distance therebetween effects the movement of the intermediary members relative to the thrust plate and the actuator through the second range of permitted radial movement and then effects the movement of the ramp members relative to the intermediary members through the first permitted range of relative movement.

6. The tire-building equipment as defined in claim 1 wherein the intermediary members include a first set of intermediary members which are disposed between the thrust plate and the ramp members and a second set of intermediary members which are disposed between the actuator and the ramp members wherein the first and second sets of intermediary members are adapted to move in unison relative to the thrust plate and the actuator and toward and away from the centerline of the equipment and wherein the ramp members are adapted to move in unison relative to the first and second sets of intermediary members and toward and away from the centerline of the equipment so that movement of the thrust plate and the actuator toward and away from one another along the centerline of the equipment effects the movement of the ramp members relative to the first and second sets of intermediary members through the first permitted range of radial movement and effects the movement of the first and second sets of intermediary members relative to the thrust plate and the actuator through the second range of permitted radial movement.

7. The tire-building equipment as defined in claim 6 wherein there is associated with the ramp members a first set of elongated guideways with which the ramp members are guided along the first and second sets of intermediary members as the ramp members move relative to the intermediary members as aforesaid through the first permitted range of radial movement and there is associated with the thrust plate and the actuator a second set of elongated guideways with which the first and second sets of intermediary members are guided as the intermediary members move relative to the thrust plate and the actuator as aforesaid through the second permitted range of radial movement.

8. The tire-building equipment as defined in claim 7 wherein the intermediary members of the first and second sets of intermediary members include guide blocks which are connected to the first set of elongated guideways for sliding movement along the length thereof and which are connected to the second set of elongated guideways for sliding movement along the length thereof so that the movement of the ramp members relative to the intermediary members is effected as the first set of elongated guideways is slidably moved along the guide blocks and so that movement of the intermediary members relative to the thrust plate and the actuator is effected as the guide blocks are slidably moved along the second set of guideways.

9. The tire-building equipment as defined in claim 8 wherein the second set of elongated guideways include guideways which are disposed about the actuator in a conical arrangement wherein the conical arrangement has a center axis which coincides with the longitudinal centerline of the equipment and an apex which is directed toward the thrust plate.

10. In tire-building equipment having apparatus defining an outer circumference or an inner circumference to serve as a forming surface or as a circumference-engaging surface wherein the equipment includes two opposite ends and a longitudinal centerline, the improvement comprising:

ramp members upon which the circumference-defining apparatus are mounted for movement radially toward and away from the centerline of the equipment wherein each ramp member includes one portion disposed adjacent one end of the equipment and another portion disposed adjacent the other end of the equipment;

a thrust plate associated with the one end of the equipment;

an actuator associated with the other end of the equipment, and the thrust plate and the actuator being mounted for movement axially of the equipment and toward and away from one another;

a first set of intermediary members which are disposed between the thrust plate and the one portions of the ramp members disposed adjacent the one end of the equipment and a second set of intermediary members which are disposed between the actuator and the another portions of the ramp members disposed adjacent the other end of the equipment wherein the first and second sets of intermediary members are permitted to move relative to the thrust plate and the actuator toward and away from the centerline of the equipment and wherein the ramp members are permitted to move relative to the first and second set of intermediary members toward and away from the centerline of the equipment; and the intermediary members cooperating with the thrust plate, the actuator and the ramp members so that the axial movement of the thrust plate and the actuator toward and away from one another effects the movement of the first and second sets of intermediary members relative to the thrust plate and the actuator as aforesaid and effects the movement of the ramp members relative to the first and second sets of intermediary members as aforesaid so that the radial distance that the ramp members are capable of moving toward or away from the centerline of the equipment is compounded by the extent of the permitted movement of the first and second sets of intermediary members relative to the thrust plate arid the actuator and the extent of the permitted movement of the ramp members relative to the first and second sets of intermediary members.

11. The tire-building equipment as defined in claim 10 wherein there is associated with the ramp members a first set of elongated guideways with which the ramp members are guided along the first and second sets of intermediary members as aforesaid and there is associated with the thrust plate and the actuator a second set of elongated guideways with which the first and second sets of intermediary members are guided along the thrust plate and the actuator as aforesaid.

12. The tire-building equipment as defined in claim 11 wherein the intermediary members of the first and second sets of intermediary members are provided by guide block assemblies which are each connected to the first set of guideways for sliding movement along the length thereof and which are each connected to the second set of guideways for sliding movement along the length thereof.

13. In tire-building equipment having apparatus defining an outer circumference or an inner circumference to serve as a forming surface or as a circumference-engaging surface, respectively, wherein the equipment includes two opposite ends and a longitudinal centerline extending between the ends, the improvement comprising:

ramp members upon which the circumference-defining apparatus are mounted for movement radially toward and away from the centerline of the equipment wherein each ramp member includes one portion disposed adjacent one end of the equipment and another portion disposed adjacent the other end of the equipment;

a thrust plate associated with the one end of the equipment;

an actuator associated with the other end of the equipment, and the thrust plate and the actuator being mounted for movement axially of the equipment and toward and away from one another; and a first set of guide block assemblies interposed between the thrust plate and the one portions of the ramp members and a second set of guide block assemblies interposed between the actuator and the another portions of the ramp members so that by moving the actuator and the thrust plate axially toward and away from one another, the ramp members are permitted to slidably move relative to the guide block assemblies of the first and second guide block assemblies to effect the movement of the circumference-defining apparatus radially toward and away from the centerline of the equipment between first and second radial limits of travel and the guide block assemblies of the first and second guide block assemblies are permitted to slidably move relative to the thrust plate and the actuator to effect the movement of the circumference-defining apparatus radially toward and away from the centerline of the equipment between second and third limits of travel to thereby accommodate an adjustment in the diameter of the circumference of the equipment through a relatively large range.

14. The tire-building equipment as defined in claim 13 further comprising guide track members which are associated with each of the thrust plate and the actuator and with the one portions of the ramp members and the another portions of the ramp members, the guide block assemblies of the first set of guide block assemblies are slidably connected to the guide track members associated with the thrust plate and the one portions of the ramp members, and the guide block assemblies of the second set of guide block assemblies are slidably connected to the guide track members associated with the actuator and the another portions of the ramp members so that by moving the actuator and the thrust plate axially toward and away from one another, the guide block assemblies of each of the first and second sets of guide block assemblies are permitted to slidably move along the guide track members to which they are connected to accommodate an adjustment in the diameter of the circumference of the equipment.

15. The tire-building equipment as defined in claim 14 wherein each of the guide track members extends along a path which has a radially-directed component so that as the actuator and the thrust plate are axially moved toward and away from one another, the guide track members and the guide block assemblies are permitted to move relative to one another and in radially-extending directions therealong to thereby effect the movement of the ramp members radially toward and away from the centerline of the equipment.

16. The tire-building equipment as defined in claim 15 wherein the circumference-defining apparatus is movable between a fully collapsed condition of the equipment and a fully expanded condition of the equipment, the guide track members includes
   a first set of guide track members which are disposed between the guide block assemblies of the first set of guide block assemblies and the one portions of the ramp members and between the guide block assemblies of the first set of guide block assemblies and the another portions of the ramp members, and
   the guide track members further includes a second set of guide track members which are disposed between the guide block assemblies of the first set of guide block assemblies and the thrust plate and between the guide block assemblies of the second set of guide block assemblies and the actuator for movement relative to the thrust plate and the actuator and wherein the improvement further includes
   means for constraining the first and second set of guide block assemblies from moving relative to and along one of the first or second sets of guide track members until the first and second set of guide block assemblies have been moved relative to and along the other of the first or second sets of guide track members so that as the circumference-defining apparatus is moved from the fully collapsed condition toward the fully expanded condition and from the fully expanded condition toward the fully collapsed condition, the first and second set of guide block assemblies must be moved in sequence relative to and along one of the first and second sets of guide track members.

17. The tire-building equipment as defined in claim 16 further including means for biasing each of the guide block assemblies in one direction along the guide track members so that as the thrust plate and actuator are moved toward or away from one another, the guide block assemblies are prevented from moving relative to and along one of the first and second sets of guide track members by the biasing force of the biasing means as long as the guide block assemblies are permitted to be moved relative to and along the other of the first and second sets of guide track members.

18. The tire-building equipment as defined in claim 17 wherein the biasing means is in the form of an elastomeric band which encircles the guide block assemblies about centerline of the equipment.

\* \* \* \* \*